Patented May 25, 1926.

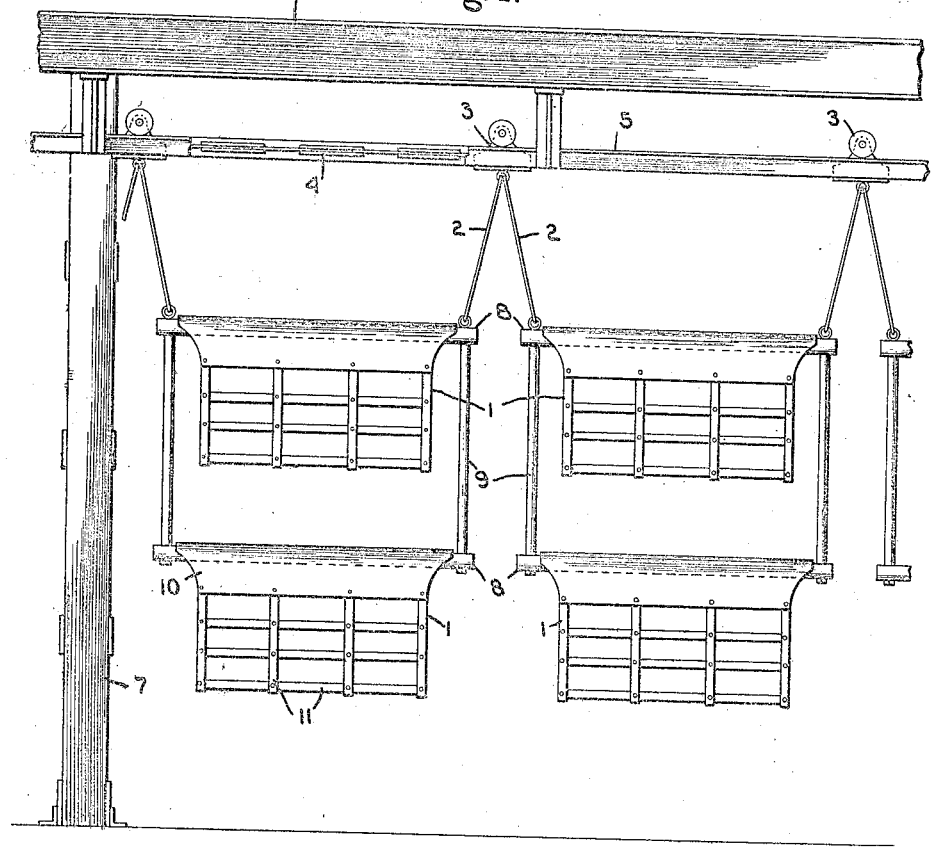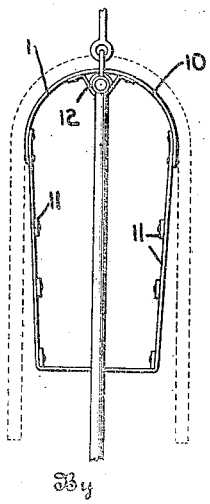

1,585,685

UNITED STATES PATENT OFFICE.

MAX H. PADE, OF AKRON, OHIO, ASSIGNOR TO THE FIRESTONE TIRE AND RUBBER COMPANY, OF AKRON, OHIO, A CORPORATION OF OHIO.

CONVEYER.

Application filed April 28, 1920. Serial No. 377,235.

This invention relates to an apparatus for use in rubber factories and has for its object an efficient device for holding and cooling the sheeted rubber. This improved form of spacer is designed to be used in connection with the conveyer set forth in the patent to Lee R. McGuire on "rubber conveying and soapstoning apparatus," No. 1,369,932, dated March 1, 1921.

It is the object of this invention to provide a carrier or spacer for the sheets of rubber as they are taken from the mills on which they are compounded or massed. The sheets of rubber are hot and must be cooled before they can be handled and to enable them to cool more quickly they are spread out and not allowed to fold together while on the conveyer so that all of their surface is exposed to the atmosphere.

Heretofore, the sheeted rubber has been soapstoned immediately after being removed from the mills and placed on horizontal open-meshed racks until cooled sufficiently for further handling. In mill rooms where large numbers of mills are operated, the result has been that the air becomes saturated with soapstone and is unhealthful for the operators. In the patent above referred to it was proposed to carry the rubber directly from the mills to a central soapstoning station or chamber in which all the soapstoning is done, thereby eliminating a large percentage of soapstone contained in the air of the mill room. It is to the conveyer apparatus for carrying the hot sheeted rubber from the mills to the soapstoning point that this invention relates.

The above and other objects will more fully appear from the following description and it will be understood that changes and modifications may be made in form and proportions without departing from the spirit of the invention.

Fig. 1 is a side elevation of a conveyer embodying my invention.

Fig. 2 is an enlarged end view of one of the spacers or racks.

1 represents the carrier spacers which are suspended by links or rods 2 from a plurality of carriages 3 connected by the conveyer chain 4. Carriages 3 are adapted to run on a rail 5 supported from a horizontal framework 6 carried by uprights or standards 7 comprising the conveyer disclosed in the patent to Lee R. McGuire, No. 1,369,932.

From the links 2 are suspended horizontal rods 8 and vertical connecting rods 9, the spacer 1 being supported by the horizontal rods 8.

The spacers are composed of a curved bearing plate 10 and an open framework, mesh or grid iron strips, or bars 11. The strips 11 afford a carrier that is very strong and rigid and one that is well ventilated. The plate 10 is held on the cross rods 8 by clips 12 that prevent the carriers being pulled away from the conveyer as the sheets of rubber are removed therefrom. The breadth and smooth surface of the curved plate 10 allows the rubber strip to be pulled off the spacer without injury to the material. As will be seen from an inspection of Fig. 2, the vertical frame strips or grid 11 converge toward the center at the bottom, thus aiding in the ventilation and preventing the sides of the spacer from contacting with the rubber as it hangs from the conveyer.

In the earlier construction of hangers a carrier for the purpose of supporting hot rubber sheets has been made of strips of metal in the form of triangular stirrups or the like, depending from a horizontal bar. This construction has several disadvantages as it was found that the narrow horizontal bars would bend the rubber sheet too sharply and the rubber would stretch of its own weight to such an extent as to injure it. Further, as the stirrups spread outwardly below the bar, the mass of hot rubber would sink between and around the stirrups and after it was cooled removal was almost impossible. Oftentimes the rubber would sag between the stirrups from both sides to such an extent that contact would occur with resultant sticking which necessitated the rubber being cut down in order to be removed from the conveyer. When the men threw the sheet or blanket of rubber on the carrier, the ends would often slap through and strike the other side of the sheet. The hot rubber would stick with a tenacity that would defy separation. By the improved design of carrier, the objections noted are obviated and a practical carrier for the hot rubber sheet is provided.

It will be appreciated by those familiar with the art that hot unvulcanized rubber is a very peculiar and difficult thing to handle. This apparatus is designed to carry unsoapstoned rubber from the compounding mills to a central soapstoning station, the object being to concentrate the soapstoning at one point and avoid the objectionable filling of the air of the mill room with soapstone. The transportation of the hot, sticky, stretchable, and slightly fluid rubber is a problem, which presents many difficulties not apparent to those who have never attempted it.

The arched surface 10 constitutes a supporting surface around which rubber sheet hangs without stretching and the grid formed by the crossing bars 11 prevents the skirts of the rubber from contacting as the strip is thrown on the conveyer. The fact that the grids converge inwardly, as shown in Fig. 2, prevents any pressure of the rubber there-against, and the material will not become embedded in the framework of the conveyer.

Although the support or rack for the rubber is illustrated primarily as a part of a conveyer. It is possible to use the rack in any other relation and my invention is not confined to conveying alone.

As will be seen from the foregoing description and the drawings, this invention provides a carrier upon which the strips of rubber may be transported and cooled with great facility.

The description contained herein has been given for clearness of understanding only, it being obvious that as many changes and modifications as possible within the scope of the invention are intended to be covered herein.

I claim:

1. A conveyer of the character described, comprising a framework, a carriage movable thereover, a work carrier supported by said carriage, said carrier being composed of an open framework of narrow strips of metal, and a curved bearing plate adapted to receive the material thereon.

2. In a device for the uses and purposes set forth, an arched plate, and grids depending from said plate and converging inwardly.

3. In a device for the uses and purposes set forth, an arched plate, and spaced bars depending from said plate and converging inwardly.

4. A movable carrier for the uses and purposes set forth, comprising a horizontal rod, an arched plate over said rod, and spaced grids depending from said plate and converging inwardly.

MAX H. PADE.